US008655565B2

(12) United States Patent
Dagenais et al.

(10) Patent No.: US 8,655,565 B2
(45) Date of Patent: **\*Feb. 18, 2014**

(54) THREE-WHEEL VEHICLE ELECTRONIC STABILITY SYSTEM AND CONTROL STRATEGY THEREFOR

(75) Inventors: Mario Dagenais, Lac Brome (CA); Daniel Mercier, Magog (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,254

(22) Filed: Nov. 14, 2011

(65) Prior Publication Data
US 2012/0061160 A1    Mar. 15, 2012

Related U.S. Application Data

(63) Continuation of application No. 12/326,059, filed on Dec. 1, 2008, now Pat. No. 8,086,382.

(60) Provisional application No. 60/991,641, filed on Nov. 30, 2007.

(51) Int. Cl.
*G06F 19/00* (2011.01)
*B60T 7/12* (2006.01)
*B60K 28/16* (2006.01)

(52) U.S. Cl.
USPC .................. 701/70; 701/48; 701/79; 180/197

(58) Field of Classification Search
CPC ....................................................... G06F 19/00
USPC ................. 180/271, 197, 205, 207, 282, 210;
701/38, 48, 54, 70, 71, 73, 78, 79, 80,
701/82, 83, 84; 303/137, 139, 141, 144,
303/147, 148, 149, 150, 154, 155, 167
See application file for complete search history.

(56) References Cited

U.S. PATENT DOCUMENTS 6,266,600 B1 *   7/2001   Miyazaki ........................ 701/71
6,409,286 B1     6/2002   Fennel
(Continued)

FOREIGN PATENT DOCUMENTS

| CN | 1672977 A | 9/2005 |
| CN | 1749077 A | 3/2006 |
| WO | 2007130043 A1 | 11/2007 |

OTHER PUBLICATIONS

International Search Report of PCT/US2008/085206; Mar. 13, 2009; Baeza Felez, LLuis.

(Continued)

*Primary Examiner* — Karen Beck
(74) *Attorney, Agent, or Firm* — BCF LLP

(57) ABSTRACT

A method for enhancing stability of a three wheel vehicle having a pair of front wheels and a single rear wheel, each of the wheels having a tire with a tire grip threshold. The method including deploying an electronic stability system (ESS) on the vehicle, providing the ESS with input from various vehicle sensors related to the longitudinal and lateral acceleration of the vehicle, causing the ESS to determine whether (i) a precursory condition indicative of a wheel lift exists and (ii) the tire grip threshold of any of the tires has been exceeded; and when a precursory condition indicative of a wheel lift exists and the tire grip threshold of none of the tires has been exceeded, causing the ESS to reduce the longitudinal acceleration of the vehicle by a first amount less than that which would cause the tire grip threshold of any of the tires to be exceeded.

18 Claims, 11 Drawing Sheets

(56) References Cited

U.S. PATENT DOCUMENTS

| | | |
|---|---|---|
| 7,668,645 B2 | 2/2010 | Lu et al. |
| 7,841,438 B2 | 11/2010 | Sigmund |
| 7,881,850 B2 * | 2/2011 | Lu et al. .......................... 701/70 |
| 2005/0131604 A1 | 6/2005 | Lu |
| 2006/0180372 A1 * | 8/2006 | Mercier et al. ................ 180/210 |
| 2009/0127013 A1 | 5/2009 | Sigmund |
| 2011/0035111 A1 | 2/2011 | Dagenais et al. |

OTHER PUBLICATIONS

English Abstract of CN1749077, Published Mar. 22, 2006; Retrieved from http://worldwide.espacenet.com on May 28, 2013.
English Abstract of CN1672977, Published on Sep. 28, 2005; Retrieved from http://worldwide.espacenet.com on May 28, 2013.
English Translation of Chinese Office Action dated Jul. 17, 2012.

* cited by examiner

THREE-WHEEL VEHICLE ELECTRONIC STABILITY SYSTEM AND CONTROL STRATEGY THEREFOR

CROSS-REFERENCE TO RELATED APPLICATIONS

The present application is a continuation of U.S. patent application Ser. No. 12/326,059 filed Dec. 1, 2008 and entitled 'Three-Wheel Vehicle Electronic Stability System and Control Strategy Therefor', which claims the benefit of priority to U.S. Provisional Patent Application Ser. No. 60/991,641 (filed Nov. 30, 2007). These applications are incorporated herein by reference.

INCORPORATION BY REFERENCE

The entirety of each of the following documents is incorporated in herein by reference: U.S. Provisional Patent Application Ser. Nos. 60/547,092 (filed 25 Feb. 2004), 60/547,089 (filed 25 Feb. 2004), 60/496,905 (filed 22 Aug. 2004); U.S. patent application Ser. No. 10/920,226 (filed 18 Aug. 2004, published as US 2006/0180372); International Application Nos. PCT/US2006/017477 (filed 5 May 2006, published as WO 2007/130043) and PCT/US2006/016352 (filed 1 May 2006, published as WO 2007/130015); and U.S. Pat. No. 6,263,261 (issued 17 Jul. 2001); U.S. Pat. No. 6,324,446 (issued 27 Nov. 2001); U.S. Pat. No. 6,086,168 (issued 11 Jul. 2000); U.S. Pat. No. 6,409,286 (issued 25 Jun. 2002); U.S. Pat. No. 6,338,012 (issued 1 Jan. 2002); U.S. Pat. No. 6,643,573 (issued 4 Nov. 2003); and U.S. Pat. No. 6,745,112 (issued 1 Jun. 2004).

FIELD OF THE INVENTION

The present invention relates to vehicle electronic stability systems for vehicles, particularly such systems for three wheel vehicles having two wheels in the front and one wheel in the rear.

BACKGROUND OF THE INVENTION

Recently, there has come to be known a new class of road vehicle, namely, the three wheeled road vehicle having two wheels in the front and one wheel in the rear. Because of its novelty, there is as of yet no generic name for this class of vehicle. One example of a vehicle of this type may be found in U.S. Pat. No. 6,948,581 assigned to Bombardier Recreational Products Inc. (BRP Inc.), the assignee of the present application. A commercial example of such a vehicle is the CAN-AM™ SPYDER™ vehicle sold by BRP Inc., details of which may be found at the internet web address: spyder.brp.com/en-US/.

As would be recognized by one skilled in the art, and as has been described in some of the patent documents incorporated by reference into this application, the stability of these three wheel road vehicles is inherently less than that of four wheel automobiles. Although the stability of such three wheel vehicles is both safe and adequate for the vehicles' intended purpose, i.e. road use, it is nonetheless desirable for manufacturers of such vehicles to further control their stability as much as possible. This is true particularly in view of the fact that these vehicles are new on the market and operating them is somewhat different than operating an automobile or a motorcycle, vehicles with which riders will be more familiar.

One means for increasing a vehicle's stability is through the use of an Electronic Stability System (ESS). In basic terms an ESS uses an on-board computer processor and associated memory that have programming to manage various vehicle systems (e.g. engine, braking, steering, etc.) to a degree to which the human operator of the vehicle cannot. ESS's for four-wheel automotive vehicles and the benefits thereof have been known for some time. Given their benefits, such systems are now found, in one form or another, on many automobiles currently on the market.

In view of the desirability of enhancing the stability of a three wheel vehicle and in view of the benefits of an ESS on a four-wheeler, one of the first attempts (if not the first attempt) was made to incorporate a then existing ESS for an automobile into such a three wheel vehicle. As a result of that attempt, as is described in U.S. Patent Publication No. 2006/0180372 (incorporated by reference hereinabove), it was realized that the lack of a fourth wheel and the geometry of the vehicle (and particularly the geometry of the remaining wheels) prohibited the direct usage of such an automotive ESS system on a three wheeled vehicle. Modifications (also as described in that patent publication) were necessary.

While the system described in the '372 publication functioned as intended, it was merely a first attempt. The efforts described in the '372 publication were mainly focused on modifying the then existing automotive ESS to cause it to simulate its behaviour on a four-wheel vehicle. In words, the inventors of those inventions focused their attention making the three wheel ESS perform (to the extent possible) as if it were a four-wheel ESS.

After experimentation with a vehicle equipped with the system described in the '372 publication and theoretical calculations, the present inventors realized that while the first generation system adapted an ESS to a three wheel vehicle to overcome the disadvantages of a three wheel vehicle with respect to an ESS and four wheel vehicles, it did not take into account all of the characteristics of a three wheeled vehicle. Specifically, while it was known that it was easier to roll three wheel vehicles over, previous efforts were not focused on why this was the case, they were simply focused on stabilizing the vehicle when a situation indicative of an imminent rollovered occurred.

Therefore, while the first generation ESS for three wheeled vehicles was adequate for its intended purpose, improvement was still possible and further enhancing the stability of the vehicle was desirable.

SUMMARY OF THE INVENTION

It is therefore an object of the present invention to provide an ESS for a three wheel vehicle having two wheels in the front and one wheel in the rear being an improvement over the prior art.

Depending on the circumstances, a wheeled vehicle may be undergoing various types of change in its acceleration. For example, the vehicle may be subjected to increasing lateral acceleration, such as when the driver enters a curve or attempts to turn the vehicle. It may be subjected to increasing positive longitudinal acceleration, such as when the driver requests more torque from the engine. It may be subjected to increasing negative longitudinal acceleration, such as when the driver actuates the braking system of the vehicle. (For ease of understanding, what is commonly referred to as "deceleration" is referred to in the present application by the more technical term "negative acceleration".) The vehicle may also be subjected to various combinations of these types of change in acceleration.

Acceleration to which the vehicle is subjected results from the wheel(s) being acted upon by force(s) created by actuation of one or more of the vehicle's systems, e.g. the engine, the brakes, and/or the steering system, depending on the situation. As a result of these forces(s), a friction force is generated at the wheel's tire's contact with the ground, with varying effect. As an example, in the case of a wheel driven by power from the vehicle's engine subjected to increasing torque from the engine, the friction force is responsible for maintaining the traction of the tire of the wheel on the road surface causing the power from the engine to propel the vehicle as opposed to causing the tire to slip against the road service.

Each tire is, however, limited as to the amount of friction force that can be generated. If the friction force that would be required to be generated exceeds the maximum friction force that the tire can generate, the tire will lose traction on the ground. As a result, the tire will slip against the road surface as opposed to gripping the road surface.

The maximum friction force of a tire can be expressed as the "maximum coefficient of friction" or $\mu_{max.\ max}$ is generally not a constant. For a given tire in a given situation, $\mu_{max}$ will vary according to many variables, including the chemical composition of the tire, the ambient temperature, the tire temperature, the road surface conditions (smooth, rough, cracked, dry, wet, oily, etc.), the size of tire's contact patch with the road surface, and the tire's age (to name only but a few).

In any given situation, the friction force can be represented by the coefficient of friction ($\mu$), which is the force causing the generation of the friction force (F) over the vertical load on the tire ground contact patch (N), i.e. $\mu$=F/N. As would be understood by a person skilled in the art, as long as $\mu$ is not greater than $\mu_{max}$, i.e. as long as the friction required to maintain traction of the tire on the road surface is not greater than the friction of which the tire is capable under the circumstances, the tire will maintain traction on the road surface. If not, the tire will lose traction.

The vehicle's acceleration also can effect wheel lift and rollover of the vehicle. Rollover of a vehicle is a situation where the body of the vehicle has contacted the ground. As is described more fully in some of the patent documents incorporated by reference herein, each vehicle has a center of gravity. Each vehicle also has a number of rollover axes, each rollover axis being defined by a line connecting the contact patches of adjacent tires on each side of the vehicle. Rollover of the vehicle is likely to occur when the center of gravity of the vehicle passes over the rollover axis on that side of the vehicle. This can occur, for instance, if the vehicle's lateral acceleration is so great that the wheels on one side of the vehicle lift from the ground and the vehicle begins to tilt about the rollover axis on the opposite side of the vehicle. If not corrected, this situation may become such that vehicle rolls over.

The present inventors have realized that in the prior art the exact relationship for a three wheel vehicle between the tire grip threshold and vehicle wheel lift was not understood, and therefore it previously had not been understood how this relationship should be taken into account when designing an ESS for a three wheel vehicle. The present invention arose from an attempt at understanding these relationships and how to exploit them.

In this respect, FIG. 1 shows a theoretical graph of the relationship of tire grip and vehicle rollover/wheel lift of a typical prior art four wheel automotive vehicle as a function of longitudinal and lateral acceleration of the vehicle when, prior to the acceleration, the vehicle was heading straight at a constant velocity on a flat level horizontal road surface. The curved line 1010 represents the limit of the tire grip of the vehicle (i.e. the limit of the tire grip of the first of the vehicles tires to lose grip—although usually loss of grip will occur in pairs—the front pair of tires, the rear pair of tires, or both) and can be referred to as the tire grip threshold. If, when plotted on the graph, a given set of longitudinal and lateral accelerations that the vehicle undergoes falls at a point below or on the tire grip threshold 1010 (i.e. in the space marked 1012), then the tires will all grip the road. Whereas, if when plotted on the graph a given set of "theoretical" longitudinal and lateral accelerations would fall at a point above the tire grip threshold 1010 (i.e. in the space marked 1014), at least one and usually at least two of the tires will lose their grip on the road and the vehicle or a part thereof will skid. As a person skilled in the art would understand, these are "theoretical" accelerations, because once a tire has exceeded its tire grip threshold, friction is no longer maintaining traction of the tire on the road surface and no further increase in acceleration is possible as long as the vehicle remains on flat horizontal ground and does not encounter any obstacles. It would thus not ordinarily be possible to have such accelerations, and acceleration points on the graph in space 1014 other than those bordering the tire grip threshold 1010 would not ordinarily exist under such circumstances; increases in acceleration beyond the threshold not being possible. The graph has simply been discussed in this way to illustrate the principles being explained (such that the "theoretical" acceleration may be thought of the acceleration that would have been if the tires had not lost traction). Similarly, in the context of the present application "exceeding" the tire grip threshold simply means that the acceleration has reached the point where all of the tire no longer grips the road surface (i.e. the tire has completely lost traction)—which would be the points on the graph bordering the tire grip threshold.

The straight line 1016 represents the wheel lift threshold of the vehicle. Therefore, if when plotted on the graph, a given set of longitudinal and lateral accelerations (or theoretical accelerations—see above) would fall at a point immediately above the wheel lift threshold (i.e. in the space marked 1018) the (then already skidding) vehicle will experience wheel lift (i.e. one or more—usually a pair—of wheels will lift off the ground entirely), and the vehicle will almost certainly roll over immediately thereafter. This situation will occur for instance when the skidding vehicle hits an object.

As would be understood by a person skilled in the art, it is important to note that for any given vehicle at any particular point in time (e.g. given its load factor, load distribution, tire conditions, the road conditions, the outside temperature and a whole variety of other factors), the position (and shape) of the tire grip threshold 1010 and the position of the wheel lift threshold 1016 may vary, but the relationship between them will not (i.e. the wheel lift threshold 1016 will not cross the tire grip threshold 1010, and will always remain above it—the vehicle will always require a greater acceleration to cross the wheel lift threshold 1016 than to cross the tire grip threshold 1010). That is to say that for a standard factory-equipped automotive four wheel vehicle (previously heading straight at a constant velocity on flat horizontal terrain) undergoing an increase (positive or negative) longitudinal acceleration or increasing lateral acceleration, the vehicle will always reach its tire grip threshold (and begin to skid) before reaching its wheel lift threshold.

An important point that can be seen on the graph in FIG. 1 is that the wheel lift threshold 1016 is a straight line having no slope. Therefore, a four-wheel automotive vehicle will reach its wheel lift threshold 1016 only as a result of increasing lateral acceleration. Increasing longitudinal acceleration (in either a positive or negative direction) will not cause the vehicle to reach the wheel lift threshold 1016 (unless lateral acceleration is also increased—although it will cause the vehicle to reach its tire grip threshold). As a result, only by decreasing the lateral acceleration of the vehicle can an imminent wheel lift be avoided; a change (solely) in longitudinal acceleration will not prevent the vehicle from crossing the threshold 1016. Further, under these conditions, a four wheel vehicle will only reach its wheel lift threshold 1016 after it has crossed its tire grip threshold 1010, indicating that the vehicle will be skidding before wheel lift and rollover occur. (Which will likely occur when the vehicle "trips" by having contacted an object or having had its tires dig into the ground.) For this reason, as is described in the patent documents incorporated by reference into this application, prior art four wheel automotive ESS's were focused taking corrective action by creating yaw moments to reduce the lateral acceleration of the vehicle, before it would lose tire grip (i.e. cross its tire-grip threshold) and certainly after it had to prevent wheel lift and thus roll over. As is further described in those patent documents, these yaw moments were created by selective braking of the one or more of the wheels of the vehicle.

FIG. 2, however, shows the same graph (i.e. the relationship of the tire grip threshold and the wheel lift threshold) but for a single person (i.e. the operator) three wheel rear wheel drive vehicle having two wheels in the front and a single wheel in the rear. (In this case the curve 210 still represents the limit of the tire grip of the vehicle (i.e. the limit of the tire grip of the first of the vehicle's tires to lose grip)—although loss of grip may occur in the front pair of tires, in the rear tire alone, or in both.) This graph was obtained through experimentation rather than theoretical calculation. There are major differences from that of the graph of FIG. 1. Firstly, the wheel lift threshold 216 crosses and is below the tire grip threshold 210 for a significant number of combinations of lateral and longitudinal accelerations. Secondly, the wheel lift threshold 216, while still being straight line, no longer has a slope of zero; its slope is significantly negative.

These differences are important in that they indicate that the vehicle can have wheel lift and rollover without first having lost tire grip. This is situation with which an operator is unlikely to be familiar with given its general non-occurrence on four-wheel automobiles. For obvious reasons (given that it makes rollover likely), wheel lift of the vehicle should be avoided if at all possible. Further, depending on the then current acceleration of the vehicle, an increase in the longitudinal acceleration of the vehicle alone (i.e. not accompanied by an increase in the lateral acceleration of the vehicle) can cause the vehicle the wheels to lift and the vehicle to roll over. This is again a situation with which an operator is unlikely to be familiar with given its general non-occurrence on four-wheel automobiles. Conversely, the differences indicate that wheel lift of the vehicle may be avoided (depending on the circumstances) solely by decreasing the longitudinal acceleration of the vehicle. Further, if the longitudinal acceleration of the vehicle is decreased not only may wheel lift be avoided (depending on the circumstances), in certain circumstances an increase in lateral acceleration can be tolerated before the vehicle wheels lift. This is in contrast to an automobile wherein as previously mentioned decreasing the longitudinal acceleration has no effect on the amount of increase in lateral acceleration that can be tolerated before the wheels lift and the vehicle rolls over.

The present inventors have realized then, that as a result of the foregoing, the control strategy implemented by an ESS on a three wheel vehicle can (and should) differ from that on four wheel vehicle.

As a result, in one aspect, the invention provides a method for enhancing the stability of a three wheel vehicle, the vehicle having: a frame, a pair of front wheels, the front wheels being connected to the frame via a front suspension, each of the front wheels having a tire, the tire having a tire grip threshold, a single rear wheel, the rear wheel being connected to the frame via a rear suspension, the rear wheel having a tire, the tires having a tire grip threshold, an engine supported by the frame and operatively connected to at least one of the wheels to provide power to propel the vehicle, a braking system including brakes associated with each of the wheels to brake the vehicle, a steering system including handlebars operatively connected to the front wheels to steer the vehicle, a straddle seat disposed on the frame, the seat being suitable for accommodating at least a driver of the vehicle sitting in straddle fashion, the tire grip thresholds of tires being, for a set of combinations of lateral and longitudinal accelerations that the vehicle may undergo, greater than a wheel lift threshold of a vehicle, such that the vehicle experiences wheel lift before the tires lose grip, a plurality of sensors arranged on the vehicle so as to provide electronic signals respecting vehicle information including at least engine speed, throttle position, lateral acceleration, and longitudinal acceleration, and an electronic stability system (ESS) including a processor and memory, the ESS being electronically connected to at least the engine, the sensors, the braking system, the method comprising: providing the ESS with information from the sensors related to at least longitudinal acceleration of the vehicle and the lateral acceleration of the vehicle; causing the ESS to determine, using information from the sensors and data from the memory, whether (i) a precursory condition indicative of a wheel lift exists and (ii) the tire grip threshold of any of the tires has been exceeded; and when a precursory condition indicative of a wheel lift exists and the tire grip threshold of none of the tires has been exceeded, causing the ESS to reduce the longitudinal acceleration of the vehicle by a first amount less than that which would cause the tire grip threshold of any of the tires to be exceeded.

In another as aspect, the invention provides a three wheel vehicle having: a frame, a pair of front wheels, the front wheels being connected to the frame via a front suspension, each of the front wheels having a tire, the tire having a tire grip threshold, a single rear wheel, the rear wheel being connected to the frame via a rear suspension, the rear wheel having a tire, each of the tires having a tire grip threshold, an engine supported by the frame and operatively connected to at least one of the wheels to provide power to propel the vehicle, a braking system including brakes associated with each of the wheels to brake the vehicle, a steering system including a handlebar operatively connected to the front wheels to steer the vehicle, a straddle seat disposed on the frame, the seat being suitable for accommodating at least a driver of the vehicle sitting in straddle fashion, the tire grip thresholds of tires being, for a set of combinations of lateral and longitudinal accelerations that the vehicle may undergo, greater than a wheel lift threshold of a vehicle, such that the vehicle experiences wheel lift before the tires lose grip, a plurality of sensors arranged on the vehicle so as to provide electronic signals respecting vehicle information including at least engine speed, throttle position, lateral acceleration, and longitudinal acceleration, and an electronic stability system (ESS) including a processor and memory, the ESS being electronically connected to at least the engine, the sensors, and the braking system, the memory including instructions that when executed by the processor: cause a determination, using information from the sensors including information related to the longitudinal acceleration of the vehicle, information related to the lateral acceleration of the vehicle, and data from the memory, of whether (i) a precursory condition indicative of a wheel lift exists and (ii) the tire grip threshold of any of the tires has been exceeded; and cause a reduction of the longitudinal acceleration of the vehicle by a first amount less than that which would cause the tire grip threshold of any of the tires to be exceeded when a precursory condition indicative of a wheel lift exists and the tire grip threshold of none of the tires has been exceeded.

One of the basic functions then of an ESS of the present invention is to determine whether wheel lift of the vehicle is likely (as a result of proximity of the acceleration of the vehicle to the wheel lift threshold) and whether the vehicle's tires have lost grip (as a result of the acceleration of the vehicle having crossed the wheel lift threshold), and to take corrective action accordingly. As is described below, different corrective actions may be (and preferably will be) taken depending on whether it has crossed its tire grip threshold or not.

In this respect reference is had to FIG. 3 which is similar to FIG. 2. Shaded area 220 represents a range of combinations of lateral and longitudinal accelerations in which there is believed (by designers of the vehicle) to be an increased risk of wheel lift (depending on how the acceleration changes over time). Thus, this is an area where "a precursory condition indicative of a wheel lift exists" as that expression is used in the context of the present invention. This expression should not be interpreted as meaning that a wheel lift will occur, only that the chances are greater that one might occur (depending on driver input and other factors). Further, this expression may not (and most likely will not) encompass all situations in which a wheel lift might occur (all of the situations that could occur in real-life are far to complicated for a simple graph). A wheel lift might occur in other situations as well. This expression is simply intended to cover those situations that the designers of this vehicle have identified as such. The shaded area 220 need not (and likely will not) be constant. Depending on other factors (such as, for instance, the rate and direction of change of the acceleration, whether such changes are being monitored, whether the vehicle is on an inclined road surface, etc.), the ESS may be programmed to recognise different "precursory conditions indicative of a wheel lift" under different circumstances such that different shaded areas would be represented on the graph if such conditions were plotted on the graph.

Data representing the shaded area 220 is stored within the memory of the ESS. This data may be stored in a number of ways, for example as discrete points or mathematic equations or some combination thereof. Information respecting the longitudinal acceleration of the vehicle and the lateral acceleration of the vehicle is received from the sensors by the ESS. Depending on the type of sensor used and/or the programming of the ESS, the information received by the ESS may be the actual acceleration of the vehicle; or it may simply be information sufficient to allow the ESS processor to perform whatever calculations are necessary to make a meaningful comparison between the input received from the sensors and the data stored in memory, so as to determine whether or not the aforementioned precursory condition exists. Thus, while it is preferred that the sensors directly provide the ESS with the acceleration of the vehicle, it is envisaged that the ESS could be provided with "rawer data" that it could use to make its own calculations to arrive at values representative of the acceleration of the vehicle, and then could use those values in subsequent calculations.

If the aforementioned precursory condition does exist, and the tire grip threshold of none of the tires has been exceeded, corrective action will be taken to avoid a wheel lift while, if at all possible, at the same time preventing the vehicle from skidding. Thus, the first corrective action that will be taken will be a reduction in the longitudinal acceleration of the vehicle from the vehicle's current longitudinal acceleration to one which is likely outside of the "precursory condition" zone yet that does not exceed the tire grip threshold of any of the tires.

There are two principal ways in which to reduce the longitudinal acceleration of the vehicle: Either a reduction in the torque produced by the engine can be effected or the braking system of the vehicle may be actuated. These may each be used alone or in combination, although ideally when actuating the braking system the engine torque will at least not be permitted to increase. Depending on the circumstances one way may be preferred over the other. For instance, in a situation where the vehicle accelerates too rapidly in a curve, it is likely that this situation will be dealt with by cutting engine torque (which is generally a simpler and faster way to effect a reduction in longitudinal acceleration and thus is the preferred manner). Whereas, if a rapid reduction in the longitudinal acceleration is desired or required, such as during obstacle avoidance, or if cutting the engine torque was without a sufficient effect, the braking system will likely be actuated.

The amount by which the longitudinal acceleration is reduced depends on the circumstances and the means by which the reduction is carried out. For example, the torque of the engine may be reduced by retarding or cutting off the ignition in one or more of the cylinders of engine. Typically, retarding the ignition will produce a lower reduction in the engine torque than cutting off the ignition completely. For instance in a 4-stroke V-twin engine, intermittent cutting of the ignition in one of the cylinders can produce a 25% reduction in engine torque, whereas retarding the ignition can produce a 12.5% reduction in engine torque. Combinations of both techniques may also be used to produce, for example, a 37.5% reduction in engine torque. The ESS will typically carry out increasingly more severe reductions in engine torque if previous reduction(s) were ineffective at changing the acceleration of the vehicle significantly enough such that the precursory condition of a wheel lift no longer exists. If the longitudinal acceleration is being reduced by actuating the braking system, the forces applied by the brakes on the various wheels may be a calculated force or may be based on predetermined amounts.

The memory however does further include instructions to cause the reduction of the longitudinal acceleration by a second amount (to be understood as including a further amount if more than one previous reduction in longitudinal acceleration not resulting in the tire grip threshold of any of the tires being exceeded have occurred) that would exceed the tire grip threshold (i.e. to a point such that the tires no longer have traction), after having caused the reduction of the longitudinal acceleration of the vehicle by a first amount (or amounts) less than that which would exceed the tire grip threshold of any of the tires. The acceleration at this point, however, being beyond the tire grip threshold of at least one of the tires, would mean that the vehicle or a part thereof is skidding (e.g. the vehicle is being understeered). While undesirable, this situation is nonetheless tolerable under the extreme circumstances of the vehicle's operation, whereas having done nothing would have resulted in a wheel lift.

In the aforementioned examples, the braking system was actuated so as to reduce the longitudinal acceleration of the vehicle while not directly effecting the lateral acceleration of the vehicle (i.e. not taking an action aimed at directly reducing the lateral acceleration or even preventing such acceleration from increasing). Such would be the case, for example, when all of the brakes of the vehicle are actuated simultaneously or when solely the engine torque is reduced. In such a case no (or no substantial) yaw movement is generated about the vehicle and the lateral acceleration is left unchanged (other than any secondary effect on the lateral acceleration owing to the reduction in the longitudinal acceleration, if any).

It is possible however, to reduce both the longitudinal acceleration and the lateral acceleration simultaneously by braking only one wheel (usually the outer front wheel) or by differentially braking the wheels such that one wheel (again usually the outer front wheel) is braked to a greater extent. In this way, in addition to slowing down the vehicle and reducing the longitudinal acceleration, a yaw moment will be induced about the vehicle which will reduce the lateral acceleration of the vehicle as well. This described in International Patent Application No. PCT/US2006/017477 incorporated by reference hereinabove.

In another aspect, the plurality of sensors may be arranged on the vehicle so as to provide electronic signals respecting the steering angle, and the ESS is further electronically connected to at least the steering system (e.g. a power steering actuator), and reducing the lateral acceleration of the vehicle may also be carried out by causing the ESS to actuate the steering system (whether alone or in combination with inducing a yaw moment via the braking system and/or reducing the engine torque). In such cases the steering system (usually via a power steering unit) may be actuated so as to increase the effort required to turn the wheels, thus, impeding or hindering the driver so doing, thereby reducing or preventing (at the case may be) further increases in lateral accelerations. It would be theoretically possible that in extremely rare situations the steering system (again usually via the power steering unit) could even be actuated so as to turn the wheels in a direction that would reduce the lateral acceleration on the vehicle.

It will be understood by persons skilled in the art that the various methods of acceleration reduction described above may not all take effect with the same speed. For example, cutting the engine torque will typically take effect faster (relatively) than actuating the braking system (as it takes time to actually actuate the braking cylinders). This lag time may be taken into consideration when selecting the action to be carried out (e.g. by choosing the faster acting method in certain situations). Of course, the ESS could be intentionally programmed with a delayed implementation strategy (i.e. to allow a period of time to elapse when the precursory condition exists before taking corrective action) if so desired.

In yet another aspect, the memory further includes instructions to cause a reduction of at least one of the lateral acceleration and the longitudinal acceleration of the vehicle when a precursory condition indicative of exceeding the tire grip threshold exists but a precursory condition indicative of a wheel lift does not exist. In this aspect, the ESS may combine the aforementioned novel features with the operation of prior art system.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 4:
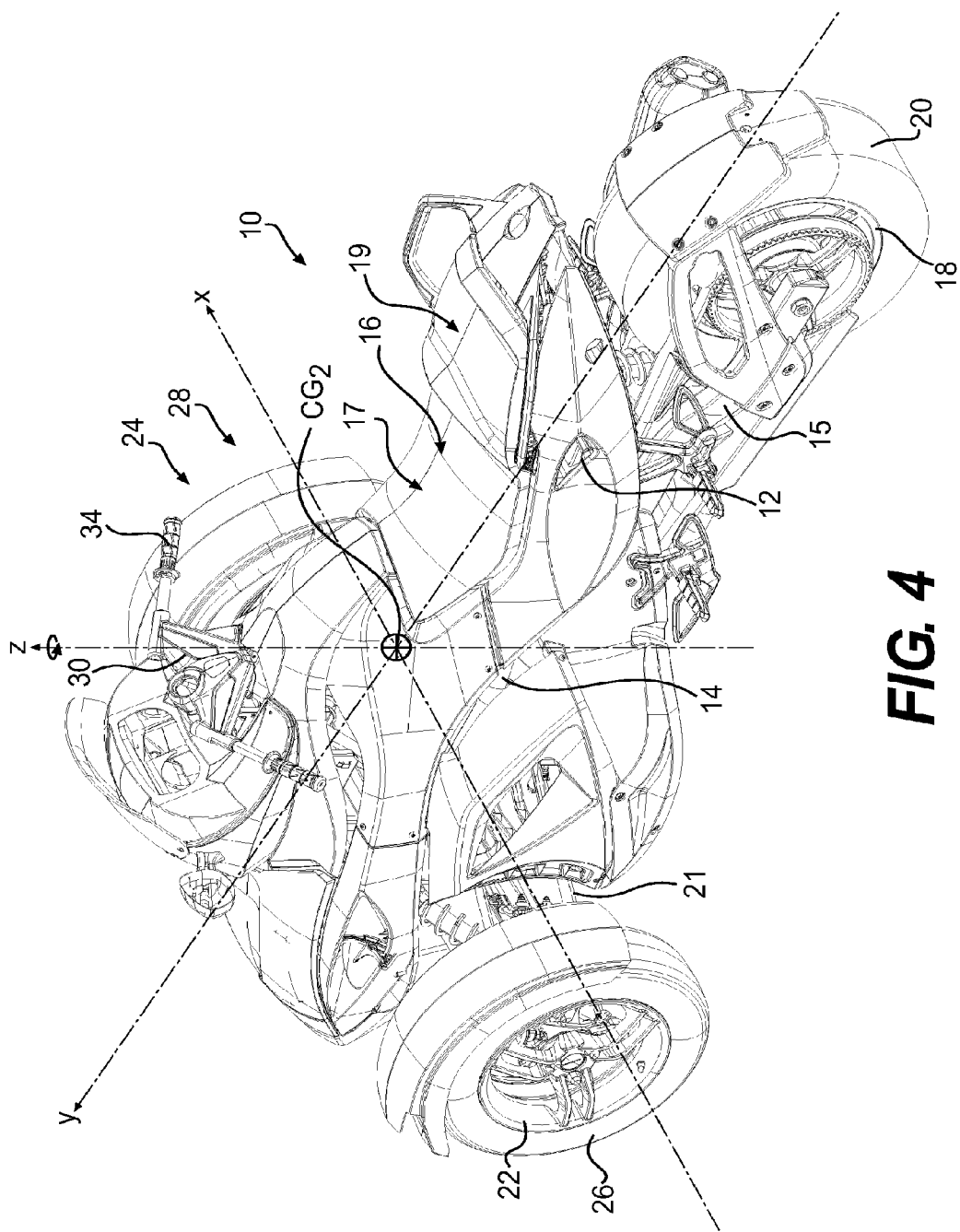
FIG. 4 is a left side rear perspective view of a three wheel vehicle having an ESS of the present invention.
Figure 5:
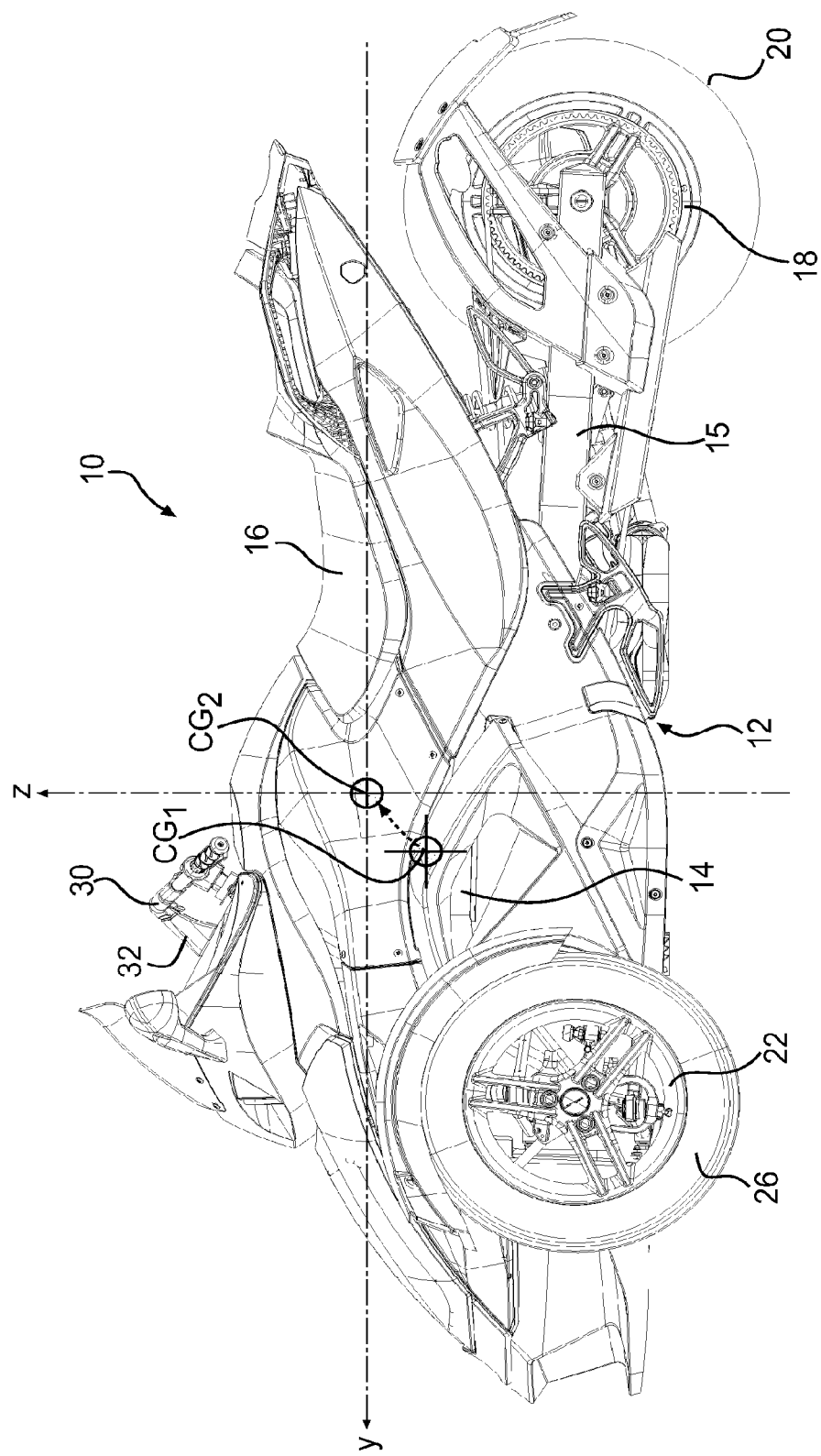
FIG. 5 is a left side elevation view of the three wheel vehicle of FIG. 4.
Figure 6:
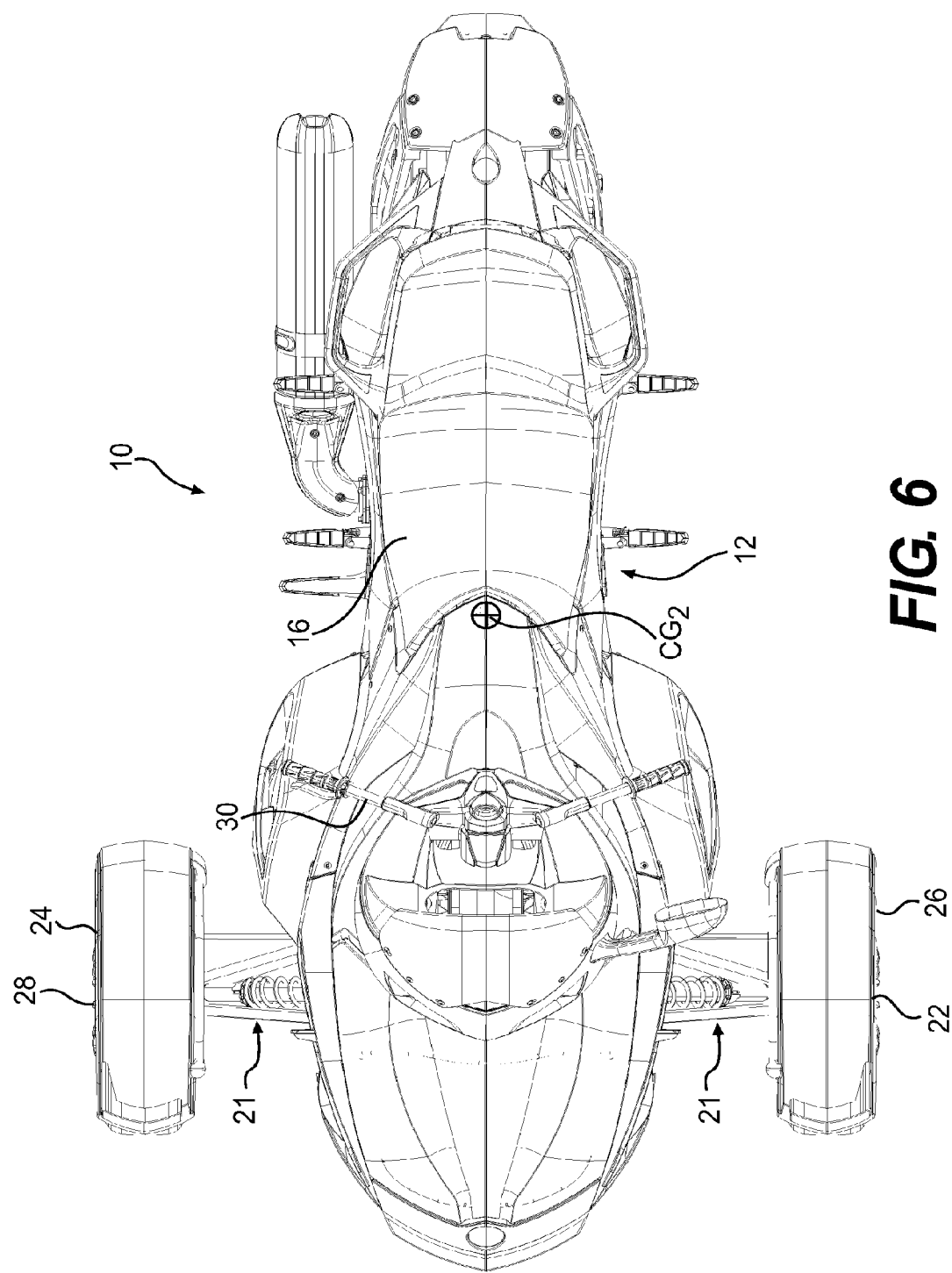
FIG. 6 is a top plan view of the three wheel vehicle of FIG. 4.

FIGS. 4, 5 and 6, illustrate a three wheel vehicle 10 in accordance with a specific embodiment of the invention. The particular aesthetic design details of the three wheel vehicle 10 are not critical to this invention, and these figures merely illustrate one possible configuration.

Vehicle Components and Systems

Figure 7:
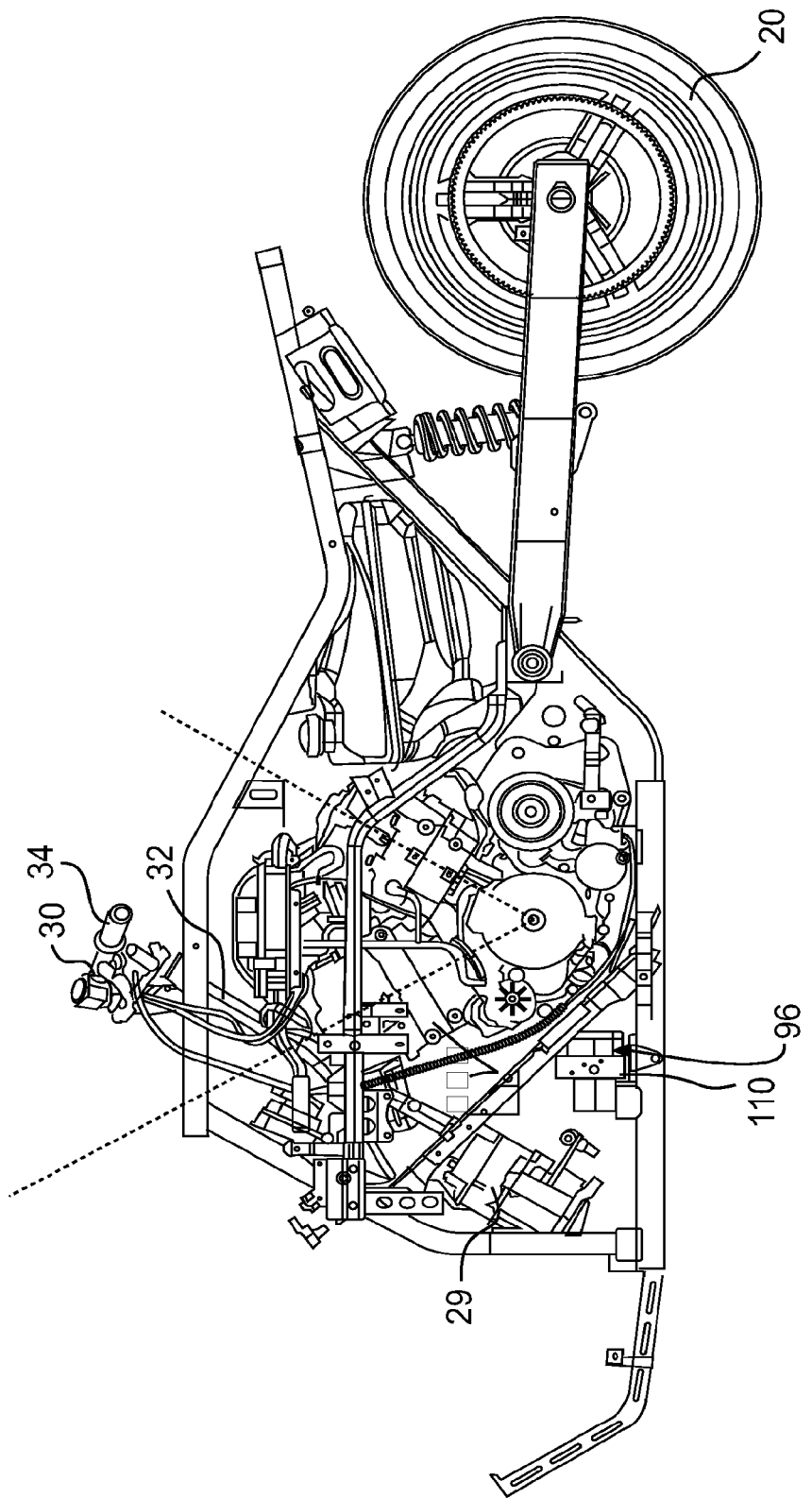
FIG. 7 is a left side elevation cut-away view of the three wheel vehicle of FIG. 7, showing interior components of the vehicle.

Vehicle 10 includes a frame 12 that supports and houses a internal combustion engine 14, but which could be any type of suitable power source such as an electric motor or hybrid engine if so desired. The engine includes a conventional Engine Management System (EMS) 107 (FIG. 8) that controls and regulates all engine functions such as RPM, torque, ignition, throttle, fuel injection, and emissions using a variety of conventional sensors and controllers (e.g. those described in U.S. patent application Ser. No. 11/627,780 and U.S. Pat. No. 6,626,140, both incorporated by reference herein). The EMS is electronically connected with the vehicle's Electronic Control Unit (ECU) 110 (in FIG. 7), described below.

A straddle seat 16 is mounted on the frame 12 and has a driver seat 17 and a passenger seat 19 disposed behind the driver seat 17.

A single rear wheel 18 with a tire 20 suitable for road use is suspended via a rear suspension 15 at the rear of the frame 12 and is operatively connected to the engine 14 through a transmission including a gearbox and belt drive, although any suitable power transmission mechanism (e.g. continuously-variable transmission, chain drive, driveshaft assembly, etc.) could be used. A pair of front wheels 22 and 24 are suspended from the front of the frame 12 through suitable front suspension 21 including upper and lower A-arms. Dampening mechanisms including shock absorber and coil spring assemblies are associated with the front suspension 21 to increase ride comfort and vehicle stability. Front wheels 22 and 24 have tires 26 and 28 suitable for road use mounted thereon. A vehicle speed sensor in the form of Hall-effect wheel speed sensors 86, 88, and 90, located at each wheel, generates signals representative of each individual wheel rotation rate. Sensors 86, 88, and 90 are electronically interconnected with the ECU 110.

Suitable tires 20, 26, 28 are those sold by Kenda USA of Reynoldsburg, Ohio under model no. 79100. Front tires 26, 28 are size 165/65 R14 and the rear tire 20 is size 225/50 R15. The tires are made of Styrene-Butadiene (SBR) copolymer and an approximate maximum coefficient of friction ($_{max}$) of 1.0 laterally and 1.1 longitudinally.

A steering system 30 is coupled to the front wheels 22 and 24 and is supported by the frame 12 for transmitting steering commands to the front wheels 22 and 24. The steering system 30 includes a steering column 32 and a handlebar 34, although other suitable steering control mechanisms such as a steering wheel could also be used. A steering sensor 98 (in the form of a Hall effect sensor, potentiometer, or anisotropic magnetoresistence sensor (AMR)), is mounted to the steering system 30 and generates signals representative of steering angle, a steering angle variation rate, and steering torque applied to the vehicle. The steering sensor 98 is electronically connected to the ECU 110. The steering system also includes a power steering apparatus 29 of the type commonly used in recreational vehicles such as all-terrain vehicles (best shown in FIG. 7) including an electric motor and a reduction gear (see U.S. Pat. No. 7,216,733, incorporated herein by reference as an example). The power steering apparatus 29 is electronically connected to the ECU 110 to provide status information thereto and receive control information therefrom.

Figure 8:
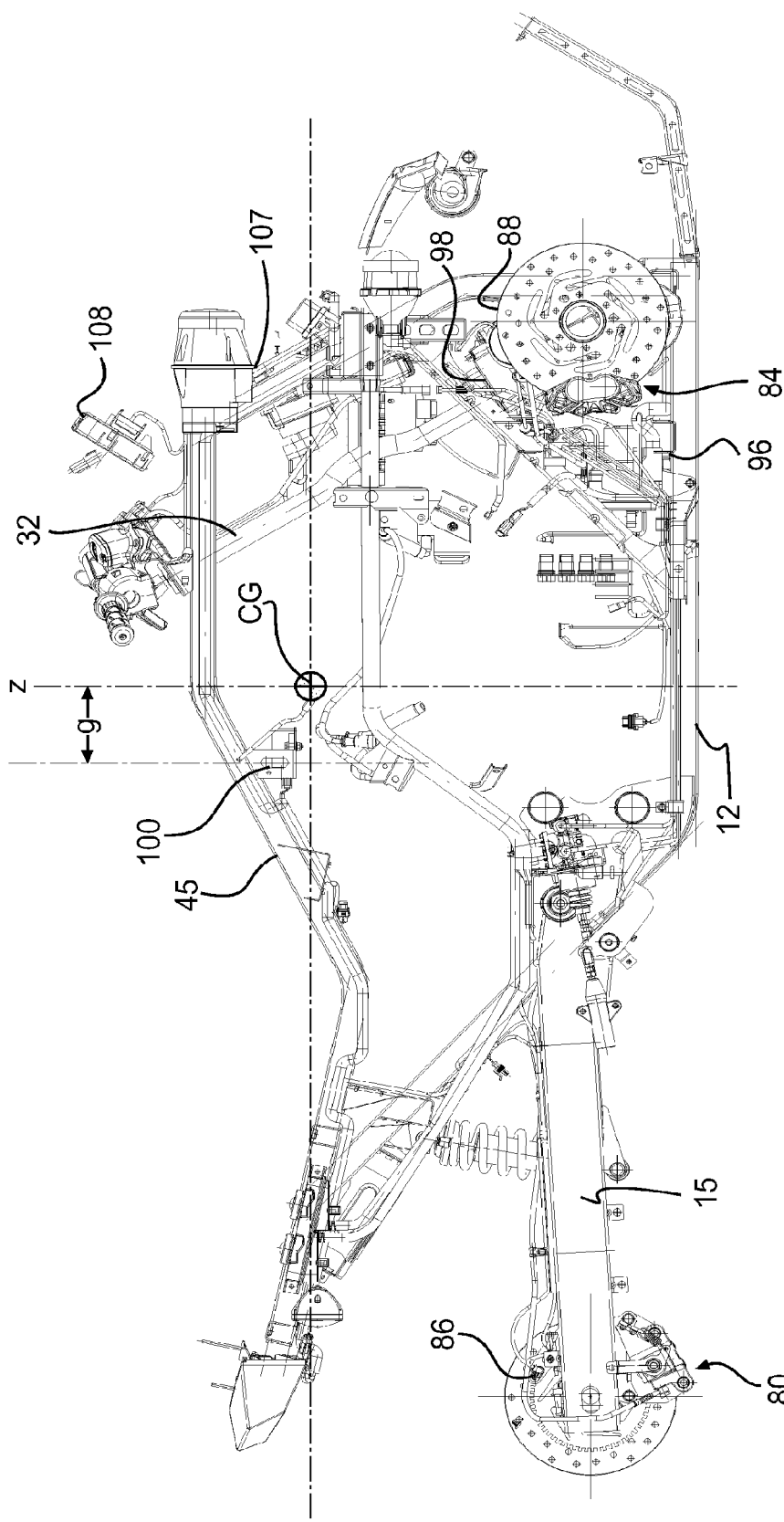
FIG. 8 is a right side elevation view of the frame of the vehicle in FIG. 4.

As illustrated in FIG. 8, the frame 12 is a supporting structure to which are connected the rear suspension 15 and the front suspension system 21. The vehicle 10 is equipped with a yaw sensor 100 having integrated lateral acceleration sensor and longitudinal acceleration sensor, which is mounted onto the upper longitudinal member 45 of the frame 12. The yaw sensor 100 is positioned in proximity to the vertical axis Z of the vehicle and center of gravity CG of the vehicle to improve the accuracy of the readings of the sensor and thus the information provided thereby. The yaw sensor 100 measures the rotational speed of the vehicle about the vertical axis Z and is a gyrometer that uses secondary Coriolis forces developed within non-stationary systems. The integrated lateral and longitudinal acceleration sensors measure the acceleration of the vehicle along the transverse axis x and the longitudinal axis y. They are Hall-type sensors. Other sensors such as a roll rate sensor (or, alternatively, a roll angle sensor), and a pitch rate sensor may be added to provide more vehicle status information. All of the sensors are interconnected with the ECU 110.

Figure 9:
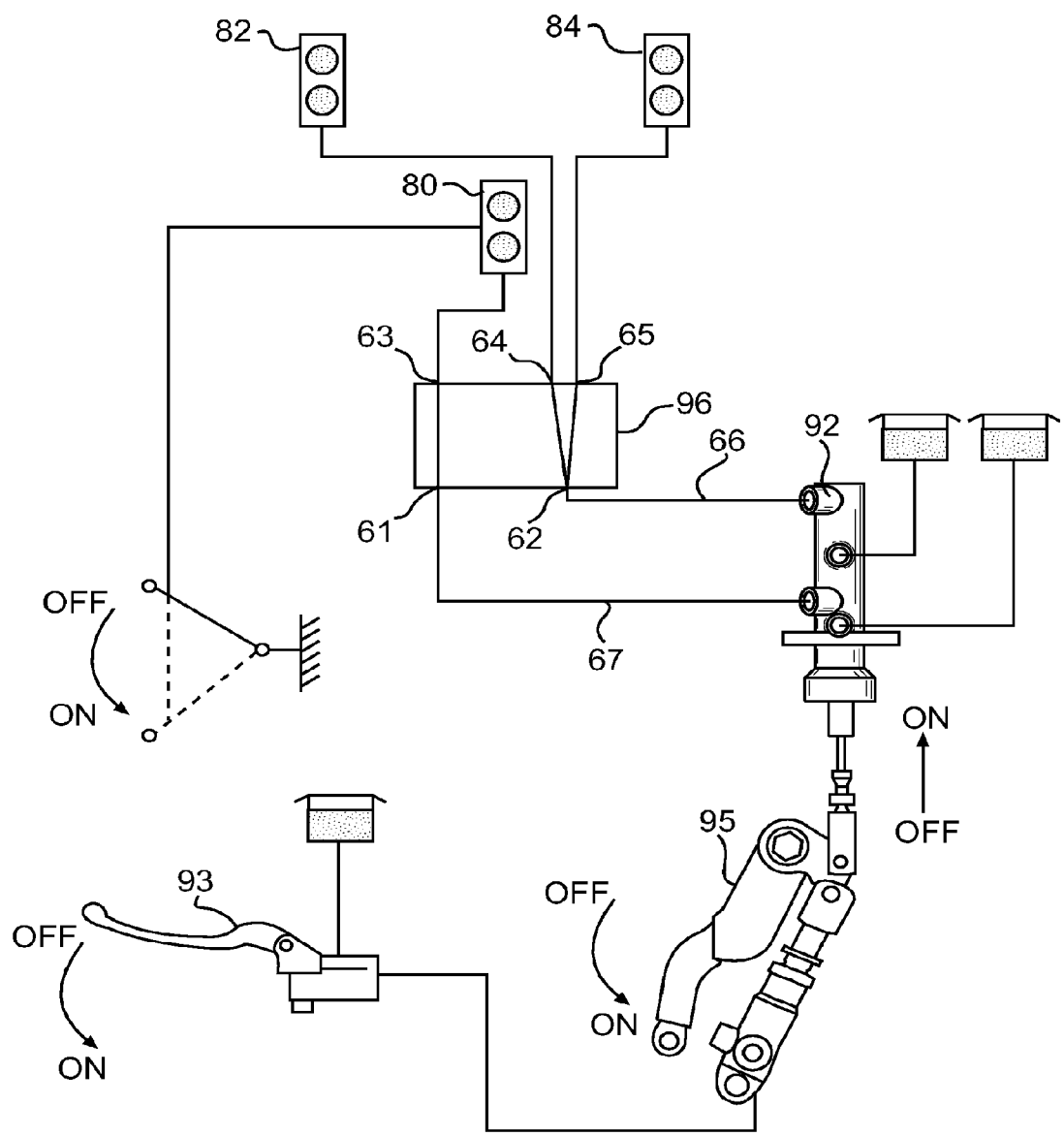
FIG. 9 is a schematic view of the braking system of the vehicle of FIG. 4.

FIG. 9 schematically illustrates the braking system of the three wheel vehicle 10. The braking system comprises individual brakes 80, 82, and 84, at each wheel 18, 22, and 24 respectively, a master cylinder 92 hydraulically connected to each brake 80, 82, and 84, a hand brake lever 93 and a foot brake lever 95 either hydraulically or mechanically connected to the master cylinder 92. The braking system also includes an hydraulic modulator 96 with integrated primer pump hydraulically positioned between the individual brakes 80, 82, and 84 and the master cylinder 92. The hydraulic modulator 96 is a basic component of an antilock braking system (ABS) which comprises at least two inlets channels 61, 62 and three outlet channels 63, 64, 65 (one for each individual brake). The master cylinder 92 typically comprises two outlet hydraulic lines 66, 67, one for the front brake circuit (66) and one for the rear brake circuit (67), which are hydraulically connected to the two inlet channels 61, 62 of the hydraulic modulator 96. The inlet channel 62 receiving the front brake hydraulic line 66 splits into two outlet channels 64, 65, each hydraulically connected to one of the front brakes 82 and 84. The inlet channel 61 receiving the rear brake hydraulic line 67 is connected to a single outlet channel 63 which is hydraulically connected to the rear brake 80. The hydraulic modulator 96 is adapted to regulate the pressure in the individual brakes 80, 82, and 84 independently of braking pressure applied by the driver. The braking system is therefore an integrated Antilock Braking System (ABS) that prevents wheel lock and improve braking efficiency. The braking system is electronically interconnected with the ECU.

The Electronic Control Unit (ECU) 110, comprising both a computer processor and memory, is responsible for vehicle electrical, electronic and closed loop control functions, including power supply to system sensors, recording operating conditions, converting, manipulating, and transmitting data, and network linkage to other controllers such as the EMS. The ECU 110 receives inputs from the various sensors and other vehicle operating systems (e.g. braking, power steering), processes the input data, and outputs signals to actuate certain operating parameters of the vehicle.

Electronic Stability System

The three wheel vehicle 10 is equipped with a specifically designed Electronic Stability System (ESS). In general, an ESS includes a computer processor and processor readable memory containing both programming information (software) and data respecting the ESS's functions. In the case of vehicle 10 the ESS is incorporated into the ECU 110 as part of the ECU's functions. (The ESS is not separately physically distinguishable from the ECU in this embodiment, but in other embodiments it would be possible that it were.) The ECU determines the actual vehicle dynamic status based on theses inputs, evaluates whether the vehicle dynamic status falls within or outside the limits of the specific stability envelope of the three wheel vehicle stored in memory and below or above specific maximum rate of changes of the vehicle dynamic status stored in memory. Thereafter, if required, the ECU outputs specific signals to various vehicle systems of the three wheel vehicle 10 to restore stability or in specific circumstances, to prevent (if possible) the vehicle from reaching the limits of the stability envelope of the three wheel vehicle.

Figure 10:
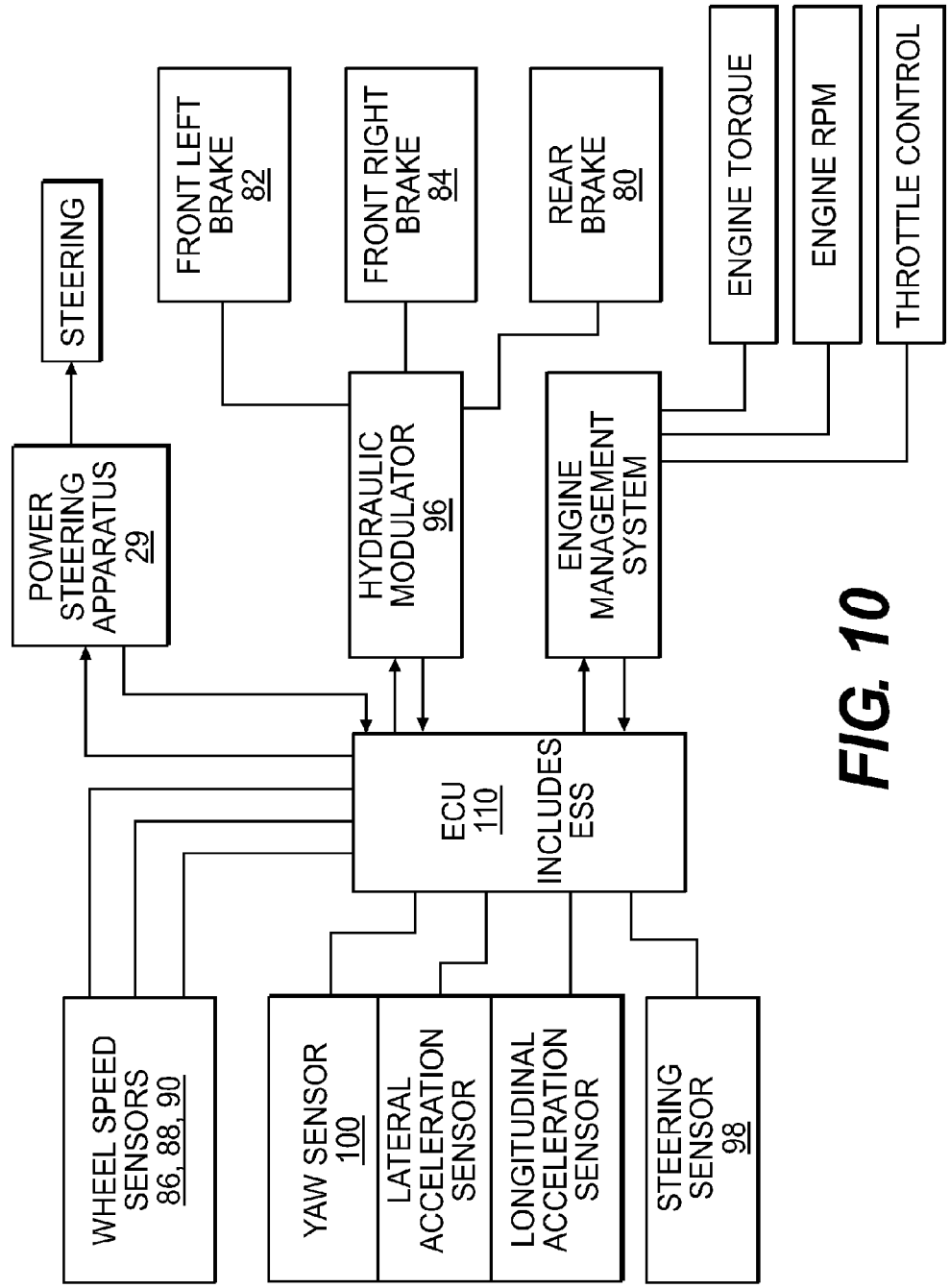
FIG. 10 is a block diagram of the ESS of the present invention showing its interconnections with other vehicle components and systems.

FIG. 10 shows a basic block diagram of the ECU (ESS) 110 in accordance with one embodiment of the invention. In operation, the ECU 110 receives inputs relating to at least some of the following factors: the yaw rate from the yaw sensor 100, wheel speed from the each wheel speed sensors 86, 88, and 90, lateral acceleration also from the integrated lateral acceleration sensor 100, longitudinal acceleration also from the integrated longitudinal acceleration sensor 100 and steering angle from the steering angle sensor 98. This information is processed by the ECU 110 to evaluate the dynamic status of the three wheel vehicle and compare it with data stored in memory defining the stability envelope of the three wheel vehicle 10 and specifically the wheel lift limits of the stability envelope to determine whether an intervention to stabilize the vehicle is required. Various intervention schemes corresponding to specific dynamic status are stored in memory and are described hereinbelow. If the dynamic status evaluated by the ECU requires an intervention, the ECU generates output signals (according to an intervention scheme) to cause the braking system or the Engine Management System or the power steering system, or some combination thereof, to take action to attempt to correct the situation.

Figure 11:
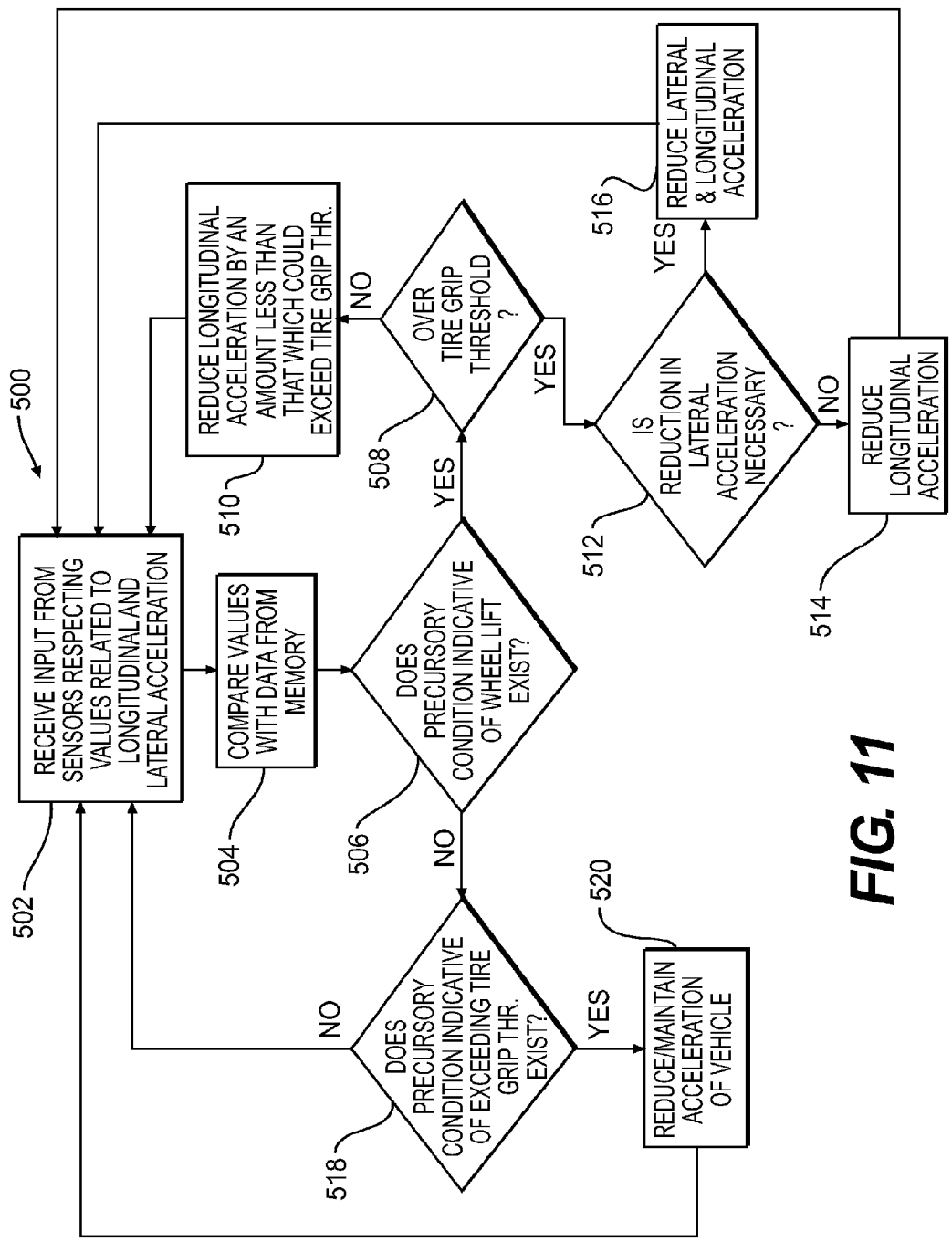
FIG. 11 is a flow diagram of a control strategy employed by an ESS of the present invention.

FIG. 11 shows a flow diagram of a control strategy 500 employed by an ESS of the present invention. Initially, and continuously, as a first step 502 the ECU receives input from the various sensors related to vehicle information including the longitudinal acceleration and the lateral acceleration and engine information from the EMS (the ECU may or may not additionally process this information—as the case may require). The ECU then 504 compares data with values stored in memory or values calculated from information stored in memory depending on the circumstances. The ECU then 506 determines whether a precursory condition indicative of a wheel lift exists. If such a condition does exist, the ECU then 508 determines whether the vehicle is over its tire grip threshold (i.e. has the tire grip threshold of any of the tires been exceeded). If the vehicle is not over its tire grip threshold, the ECU will cause 510 the reduction of the longitudinal acceleration of the vehicle by an amount less than that which would cause the vehicle to exceed its tire grip threshold (i.e. the grip threshold of at least one of the tires to be exceeded). If, however, the vehicle is over its tire grip threshold, the ECU will determine whether a reduction in lateral acceleration is necessary 512. If no reduction in lateral acceleration is necessary, the ECU will cause 514 the longitudinal acceleration of the vehicle to be reduced, which will cause the vehicle to exceed its tire grip threshold if it has not already been exceeded (the vehicle or a part thereof will be skidding or begin to skid, depending on the circumstances). If a reduction in lateral acceleration is necessary, the ECU will cause the longitudinal acceleration and lateral acceleration to be reduced 516. Returning back to step 506, if a precursory condition of a wheel lift does not exist, the ECU will then 518 determine whether a precursory condition of exceeding the tire grip exists. If this is true, then 520 the ECU will cause a reduction in the acceleration of the vehicle (this, depending on the circumstance could be the lateral acceleration, the longitudinal acceleration, or a combination of both) or maintain the vehicle acceleration at its current value (as the case may be) to prevent the tire grip threshold from being exceeded. If not, then no action will be caused to be taken by the ECU. In all cases, the ECU returns back to 500 and receives new input from the sensors and begins the process again.

Figure 1:
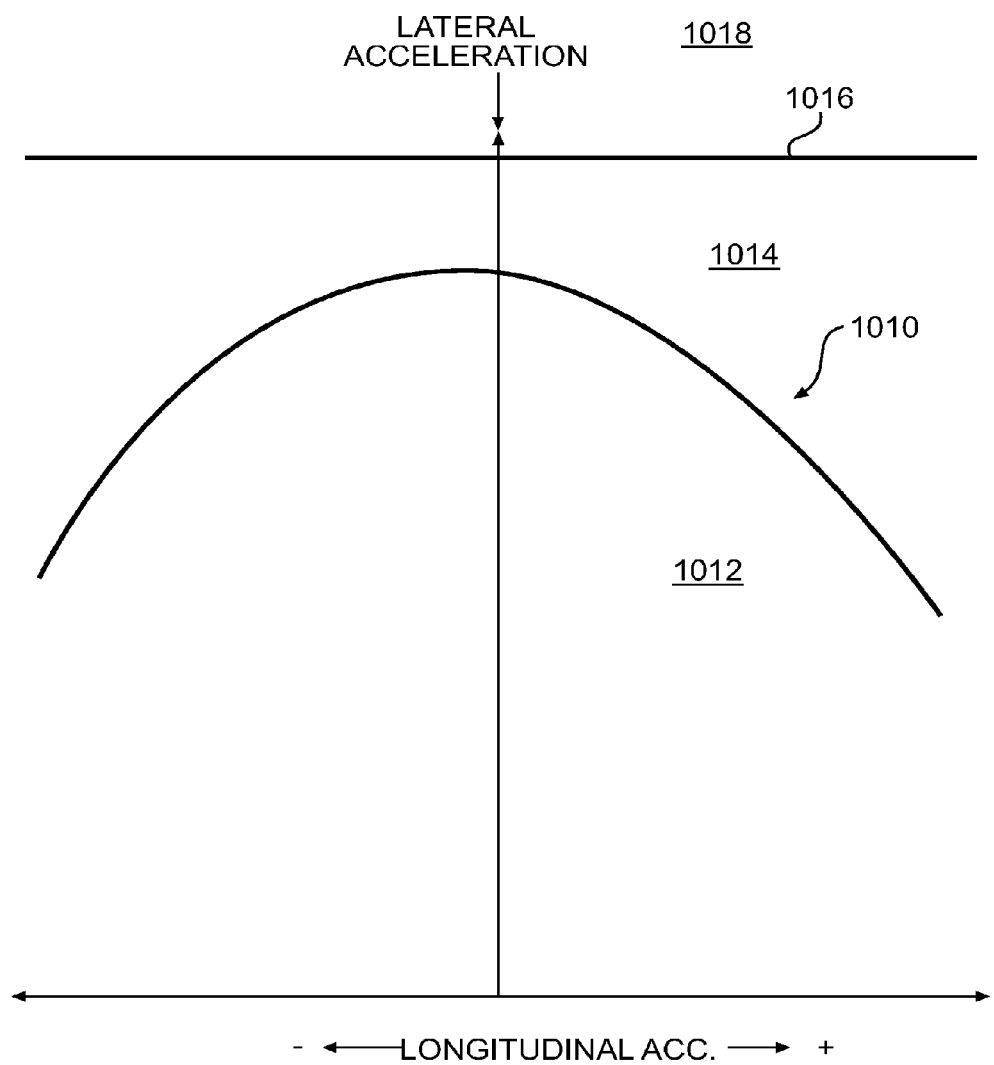
FIG. 1 is graph of the tire grip threshold and vehicle wheel lift threshold of a typical prior art four wheel vehicle.
Figure 2:
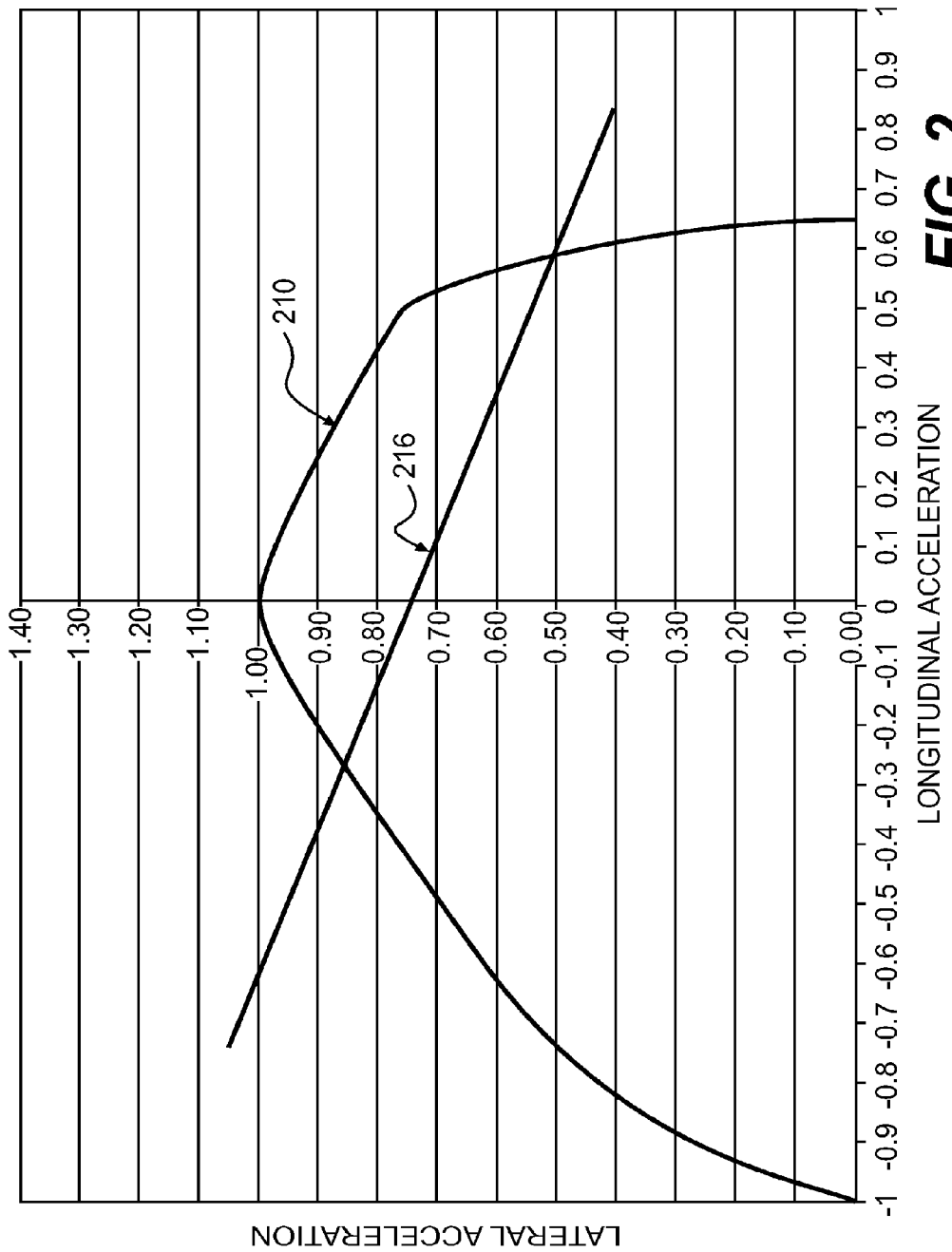
FIG. 2 is a graph of the tire grip threshold and vehicle wheel lift threshold of a typical rear wheel drive three wheel vehicle having two wheels in the front and one wheel in the rear.
Figure 3:
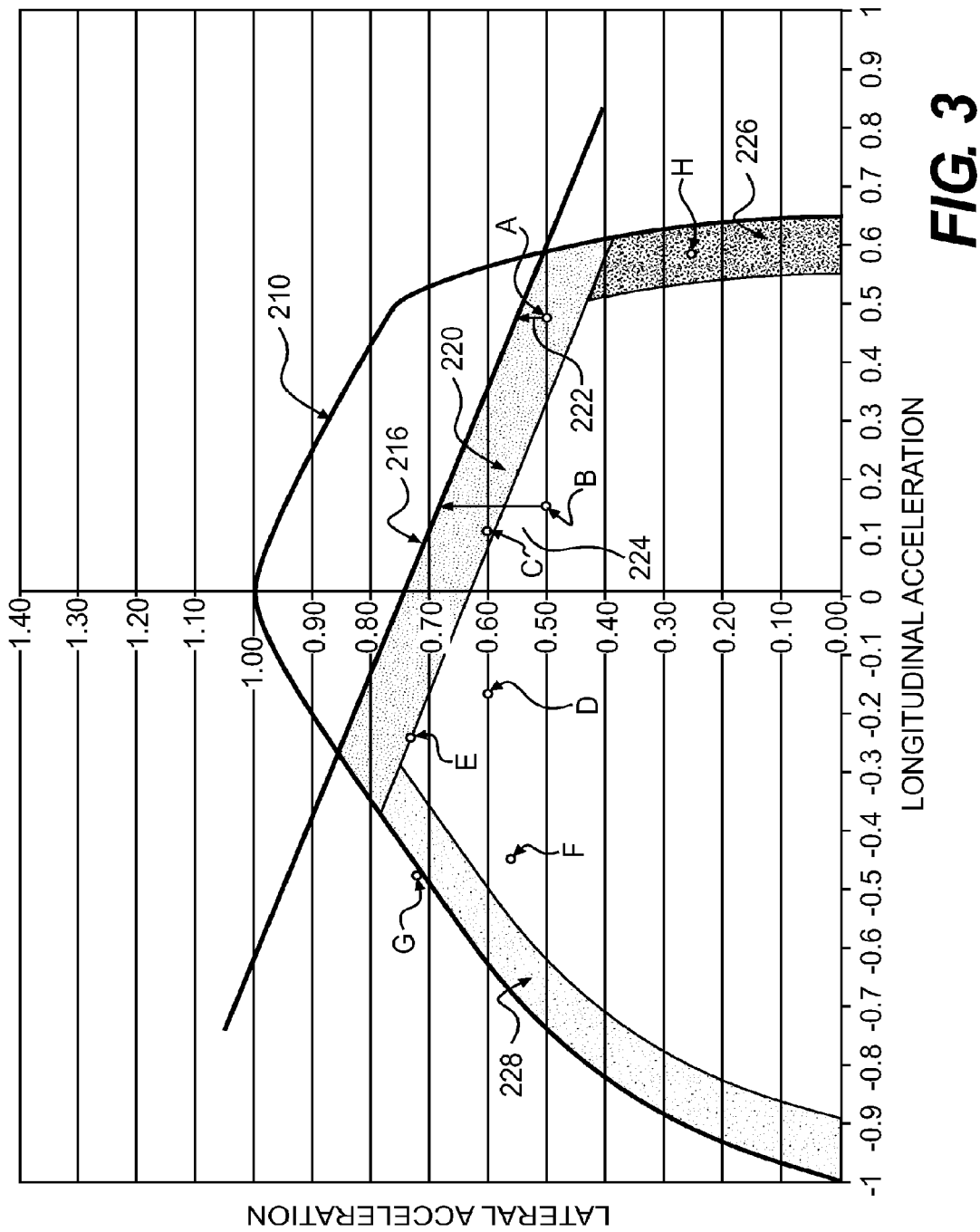
FIG. 3 is a graph of the tire grip threshold and vehicle wheel lift threshold of a typical rear wheel drive three wheel vehicle having two wheels in the front and one wheel in the rear, the vehicle included an ESS of the present invention and the graph showing typical actions of the ESS of the present invention.

Referring now to FIG. 3, as an example, if at a particular point in time the acceleration of the vehicle is at point A when plotted on the graph, point A being within the shaded area 220 (i.e. is at a point wherein a precursory condition indicative of wheel lift exists) and the tire grip threshold not having been exceeded, corrective action will be taken to reduce the longitudinal acceleration to point B. It will be noted that point B is outside of and lower on the graph than the shaded area 220 and therefore (all other things being equal) is generally a more acceptable acceleration in terms of likelihood of wheel lift. It will also be noted that the lateral acceleration of the vehicle at point B is the same as that as at point A. With acceleration being as it is at point B, the vehicle can accommodate a greater increase in lateral acceleration than at point A before reaching its wheel lift threshold 216 (compare distance 224 with distance 222). Further when the acceleration is at point B, the vehicle has not crossed the tire grip threshold and therefore the tires still have traction.

The ESS is continually operative and thus assuming that after a short period of time the operating conditions of the vehicle have changed such that acceleration of the vehicle when plotted on the graph would now be at point C. Under such circumstances the ECU could again reduce the longitudinal acceleration to point D in a similar manner as described above.

Continuing with the above example, if after another short period of time the operating conditions of the vehicle have again changed such that the acceleration of the vehicle is at point E when plotted on the graph. (The previous reductions from A to B and from C to D collectively being the "first amount" of reduction within the context of the present invention.) At this point, as a precursory condition indicative of wheel lift exists, the ESS may act in two different manners (depending on programming) In a first instance the ESS may reduce both the lateral acceleration and the longitudinal acceleration of the vehicle to point F. (Reduction by unequally braking the wheels so as to generate a yaw moment would be the preferred method of so doing.) In this manner, the ESS has enhanced the stability of the vehicle such that the vehicle remains within the tire grip threshold. Alternatively, the ESS may reduce solely the longitudinal acceleration of the vehicle to a point G. While wheel lift has been prevented, the acceleration at point G is, however, beyond the tire grip threshold, so the vehicle has begun to skid. This is situation which the driver of the vehicle may correct by reducing the lateral acceleration of the vehicle.

An ESS of the present invention will also act like a conventional ESS (assuming it is so programmed) in situations where there is no precursory condition indicative of a wheel lift yet the tire grip threshold is likely to be exceeded (i.e. a precursory condition indicative of exceeding tire grip threshold exists). Such a situation would be at point H in FIG. 3. Point H is not within shaded area 220 and thus a precursory condition indicative of a wheel lift does not exist. Nonetheless, it can be seen that if the longitudinal acceleration of the vehicle increases the tire grip threshold will be crossed. In such a situation, the ESS will either reduce the longitudinal acceleration or maintain the longitudinal acceleration (i.e. prevent its further increase), depending on its programming, in order to prevent the vehicle from crossing the tire grip threshold. This "precursory condition indicative of exceeding tire grip threshold" has been graphically shown in FIG. 3 as dotted areas 226 and 228.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A three wheel vehicle having:
   a frame,
   a pair of front wheels, the front wheels being connected to the frame via a front suspension, each of the front wheels having a tire, the tire having a tire grip threshold,
   a single rear wheel, the rear wheel being connected to the frame via a rear suspension, the rear wheel having a tire, each of the tires having a tire grip threshold,
   an engine supported by the frame and operatively connected to at least one of the wheels to provide power to propel the vehicle,
   a braking system including brakes associated with each of the wheels to brake the vehicle,
   a steering system operatively connected to the front wheels to steer the vehicle, a seat disposed on the frame, the seat being suitable for accommodating at least a driver of the vehicle, the tire grip thresholds of tires being, for a set of combinations of lateral and longitudinal accelerations that the vehicle may undergo, greater than a wheel lift threshold of a vehicle, such that the vehicle experiences wheel lift before the tires lose grip, a plurality of sensors arranged on the vehicle so as to provide electronic signals related to vehicle information including at least engine speed, engine throttle position, lateral acceleration, and longitudinal acceleration, and an electronic stability system (ESS) including a processor and memory, the ESS being electronically connected to at least the engine, the sensors, and the braking system, the memory including instructions that when executed by the processor:

cause a determination, using information from the sensors including information related to the longitudinal acceleration of the vehicle, information related to the lateral acceleration of the vehicle, and data from the memory, of whether (i) a precursory condition indicative of a wheel lift before the tires lose grip exists and (ii) the tire grip threshold of any of the tires has been exceeded; and cause a reduction of the longitudinal acceleration of the vehicle by a first amount less than that which would cause the tire grip threshold of any of the tires to be exceeded when a precursory condition indicative of a wheel lift before the tires lose grip exists and the tire grip threshold of none of the tires has been exceeded, thereby increasing an amount of lateral acceleration that the vehicle can undergo before experiencing wheel lift other than by reducing the lateral acceleration of the vehicle; and cause a reduction of the longitudinal acceleration by a second amount that would exceed the tire grip threshold of at least one of the tires, after having caused the reduction of the longitudinal acceleration of the vehicle by the first amount less than that which would exceed the tire grip threshold of any of the tires.

2. A three wheel vehicle as recited in claim 1, wherein causing the reduction of the longitudinal acceleration of the vehicle is carried out solely by causing reduction of engine torque.

3. A three wheeled vehicle as recited in claim 1, wherein causing the reduction of the longitudinal acceleration of the vehicle is carried out solely by causing actuation of the braking system of the vehicle.

4. A three wheeled vehicle as recited in claim 1, wherein causing the reduction of the longitudinal acceleration of the vehicle is carried out by causing a reduction of engine torque and by causing actuation of the braking system of the vehicle.

5. A three wheel vehicle as recited in claim 4, wherein the braking system is actuated so as not to generate a specific yaw moment on the vehicle.

6. A three wheel vehicle as recited in claim 1, further comprising, when a precursory condition indicative of a wheel lift exists and the tire grip threshold of none of the tires has been exceeded, taking no action to directly reduce the lateral acceleration of the vehicle.

7. A three wheel vehicle as recited in claim 1, wherein the memory further includes instructions that when executed by the processor will cause a reduction of the lateral acceleration of the vehicle, after having caused the reduction of the longitudinal acceleration of the vehicle by the first amount less than that which would exceed the tire grip threshold of any of the tires.

8. A three wheeled vehicle as recited in claim 7, wherein the plurality of sensors are arranged on the vehicle so as to provide electronic signals related to further vehicle information including a steering angle of the steering system, and wherein the ESS is further electronically connected to the steering system, and wherein causing the reduction of the lateral acceleration of the vehicle is carried out by causing actuation of the steering system.

9. A three wheel vehicle as recited in claim 1, wherein the memory further includes instructions that when executed by the processor cause a reduction of at least one of the lateral acceleration and the longitudinal acceleration of the vehicle when a precursory condition indicative of exceeding the tire grip threshold of at least one of the tires exists but a precursory condition indicative of a wheel lift does not exist.

10. A method for enhancing the stability of a three wheel vehicle, the vehicle having:

a frame, a pair of front wheels, the front wheels being connected to the frame via a front suspension, each of the front wheels having a tire, the tire having a tire grip threshold, a single rear wheel, the rear wheel being connected to the frame via a rear suspension, the rear wheel having a tire, the tires having a tire grip threshold, an engine supported by the frame and operatively connected to at least one of the wheels to provide power to propel the vehicle, a braking system including brakes associated with each of the wheels to brake the vehicle, a steering system operatively connected to the front wheels to steer the vehicle, a seat disposed on the frame, the seat being suitable for accommodating at least a driver of the vehicle, a plurality of sensors arranged on the vehicle so as to provide electronic signals related to vehicle information including at least engine speed, throttle position, lateral acceleration, and longitudinal acceleration, and an electronic stability system (ESS) including a processor and memory, the ESS being electronically connected to at least the engine, the sensors, the braking system, the tire grip thresholds of tires being, for a set of combinations of lateral and longitudinal accelerations that the vehicle may undergo, greater than a wheel lift threshold of a vehicle, such that the vehicle experiences wheel lift before the tires lose grip, the method comprising:

providing the ESS with information from the sensors related to at least the longitudinal acceleration of the vehicle and the lateral acceleration of the vehicle;

causing the ESS to determine, using information from the sensors and data from the memory, whether (i) a precursory condition indicative of a wheel lift exists and (ii) the tire grip threshold of any of the tires has been exceeded; and when a precursory condition indicative of a wheel lift exists and the tire grip threshold of none of the tires has been exceeded, causing the ESS to reduce the longitudinal acceleration of the vehicle by a first amount less than that which would cause the tire grip threshold of any of the tires to be exceeded; and after causing the ESS to reduce the longitudinal acceleration of the vehicle by the first amount less than that which would exceed the tire grip threshold of any of the tires, causing the ESS to reduce the longitudinal acceleration by a second amount that would exceed the tire grip threshold of at least one of the tires.

11. A method for enhancing the stability of a three wheel vehicle as recited in claim 10, wherein causing the ESS to reduce the longitudinal acceleration of the vehicle is carried out solely by causing the ESS to reduce the torque of the engine.

12. A method for enhancing the stability of a three wheeled vehicle as recited in claim 10, wherein causing the ESS to reduce the longitudinal acceleration of the vehicle is carried out solely by causing the ESS to actuate the braking system of the vehicle.

13. A method for enhancing the stability of a three wheeled vehicle as recited in claim 10, wherein causing the ESS to reduce the longitudinal acceleration of the vehicle is carried out by causing the ESS to reduce the torque of the engine and by causing the ESS to actuate the braking system of the vehicle.

14. A method for enhancing the stability of a three wheel vehicle as recited in claim 13, wherein the ESS actuates the braking system so as not to generate a specific yaw moment on the vehicle.

15. A method for enhancing the stability of a three wheel vehicle as recited in claim 10, further comprising, when a precursory condition indicative of a wheel lift exists and the tire grip threshold of none of the tires has been exceeded, having the ESS take no action to directly reduce the lateral acceleration of the vehicle.

16. A method for enhancing the stability of a three wheel vehicle as recited in claim 10, further comprising, after causing the ESS to reduce the longitudinal acceleration of the vehicle by the first amount less than that which would exceed the tire grip threshold of any of the tires, causing the ESS to reduce the lateral acceleration of the vehicle.

17. A method for enhancing the stability of a three wheeled vehicle as recited in claim 16, wherein the plurality of sensors are arranged on the vehicle so as to provide electronic signals related to further vehicle information including a steering angle of the steering system, and wherein the ESS is further electronically connected to the steering system, and wherein causing the ESS to reduce the lateral acceleration of the vehicle is carried out by causing the ESS to actuate the steering system.

18. A method for enhancing the stability of a three wheel vehicle as recited in claim 10, further comprising, when a precursory condition indicative of exceeding the tire grip threshold of at least one of the tires exists but a precursory condition indicative of a wheel lift does not exist, causing the ESS to reduce the lateral acceleration of the vehicle.

* * * * *